US008575293B2

(12) United States Patent
Horikoshi et al.

(10) Patent No.: US 8,575,293 B2
(45) Date of Patent: Nov. 5, 2013

(54) RESIN COMPOSITION FOR OPTICAL MATERIAL AND OPTICAL MATERIAL USING THE SAME

(75) Inventors: Hiroshi Horikoshi, Tokyo (JP); Motoharu Takeuchi, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 453 days.

(21) Appl. No.: 12/310,474

(22) PCT Filed: Sep. 11, 2007

(86) PCT No.: PCT/JP2007/068016
§ 371 (c)(1),
(2), (4) Date: Feb. 26, 2009

(87) PCT Pub. No.: WO2008/035643
PCT Pub. Date: Mar. 27, 2008

(65) Prior Publication Data
US 2010/0004421 A1    Jan. 7, 2010

(30) Foreign Application Priority Data
Sep. 19, 2006 (JP) ................................. 2006-252381

(51) Int. Cl.
*C08G 18/77* (2006.01)
*C08G 18/00* (2006.01)
(52) U.S. Cl.
USPC ................... 528/73; 528/48; 528/76; 528/77; 528/81; 528/377; 528/378; 528/380; 528/387; 528/388; 528/389; 359/642
(58) Field of Classification Search
USPC ............ 528/377.378, 380, 387, 388, 389, 48; 528/85, 73, 76, 77, 81; 524/589, 590, 591; 252/182.2, 182.21, 182.22; 359/642
See application file for complete search history.

(56) References Cited

U.S. PATENT DOCUMENTS

| | | | |
|---|---|---|---|
| 6,130,307 A | 10/2000 | Amagai et al. | |
| 6,194,603 B1 | 2/2001 | Kitahara et al. | |
| 6,472,495 B1* | 10/2002 | Yoshimura et al. | 528/73 |
| 7,091,307 B2* | 8/2006 | Yoshimura et al. | 528/377 |
| 2004/0024165 A1 | 2/2004 | Yoshimura et al. | |
| 2004/0122201 A1 | 6/2004 | Yoshimura et al. | |
| 2004/0158031 A1* | 8/2004 | Yoshimura et al. | 528/377 |
| 2004/0220370 A1 | 11/2004 | Kosaka | |
| 2005/0187413 A1 | 8/2005 | Kondo et al. | |
| 2008/0097045 A1* | 4/2008 | Isahaya et al. | 525/457 |

FOREIGN PATENT DOCUMENTS

| | | | |
|---|---|---|---|
| EP | 1 326 095 A1 | 7/2003 | |
| JP | 62-236818 A | 10/1987 | |
| JP | 11-352302 A | 12/1999 | |
| JP | 2001-131257 A | 5/2001 | |
| JP | 2002-122701 A | 4/2002 | |
| JP | 2005-220162 A | 8/2005 | |
| JP | 2005220162 A * | 8/2005 | C08G 18/38 |
| JP | 2007-090574 A | 4/2007 | |
| JP | 2007090574 A * | 4/2007 | |
| WO | WO 2006/001341 A1 | 1/2006 | |

OTHER PUBLICATIONS

Supplementary European Search Report mailed Jul. 19, 2010, in corresponding EP 07807420.0, 4 pages.

* cited by examiner

*Primary Examiner* — Michael L Leonard
(74) *Attorney, Agent, or Firm* — Foley & Lardner LLP

(57) ABSTRACT

According to the present invention, a resin compound for optical material, comprising (a) an episulfide compound represented by a specific structural formula, (b) a xylylenedithiol compound and (c) a xylylenediisocyanate compound can be provided. In a preferable embodiment of the present invention, a resin compound for optical material having superb optical properties, a high density and a high thermal resistance can be provided. Also according to the present invention, an optical material obtained by curing the above-described resin compound can be provided.

10 Claims, No Drawings

RESIN COMPOSITION FOR OPTICAL MATERIAL AND OPTICAL MATERIAL USING THE SAME

This application is a U.S. National Phase application under 35 U.S.C. §371 of PCT Application No. PCT/JP2007/068016, filed Sep. 11, 2007, which claims priority under 35 U.S.C. §119 (a)-(d) of Japan Patent Application No. 2006-252381, filed Sep. 19, 2006.

TECHNICAL FIELD

The present invention relates to a resin composition for optical material and also to an optical material using the same such as a plastic lens, a prism, an optical fiber, an information recording substrate, a filter or the like. The present invention is preferably usable for a plastic lens among these.

BACKGROUND ART

Plastic materials are lightweight, highly tough, and easy to dye, and therefore are in wide use for various optical materials, especially for glass lenses recently. Properties required for optical materials, especially glass lenses are as follows. Physical properties required are low specific gravity, high transparency, low yellow index, high thermal resistance, high strength and the like. Optical properties required are high refractive index and high Abbe number. A high refractive index can thin the lens, and a high Abbe number reduces the chromatic aberration of the lens. However, as the refractive index increases, the Abbe number decreases. Studies are being made for improving both of the refractive index and the Abbe number. The most representative method developed so far is a method using an episulfide compound described in Japanese Patent No. 3491660.

A lens thinned as a result of an increase in the refractive index is desired to have a higher strength than conventional lenses from the viewpoint of safety and the like. There are roughly three types of strength required for the lens. First is strength against dropping. A lens needs to have a sufficient strength not to be easily destroyed when colliding against an object or when being dropped. Second is strength against drilling. A lens should not be chipped or cracked when a hole is made in the lens by a drill; namely, a lens needs to have a good drilling processability. When a so-called two point frame is attached to the lens, holes need to be made in the lens. The lens needs to have a sufficient strength not to be chipped or cracked by this procedure. Third is a tensile strength. In order to be durable against use with a two point frame, a lens needs to have a sufficient strength not to be destroyed even when the frame is bent.

Thermal resistance is also required. As a standard practice, a plastic lens is provided with hard coat in order to protect the surface thereof. Since the lens is heated when being provided with hard coat, the lens needs to be thermally resistant.

Conventionally, various attempts have been made to strengthen materials which use an episulfide compound as described in Japanese Patent No. 3541707, Japanese Laid-Open Patent Publication No. 2001-131257, Japanese Patent No. 3562579, Japanese Laid-Open Patent Publication No. 11-352302, Japanese Patent No. 3642973, Japanese Laid-Open Patent Publication No. 2005-272788, and Japanese Patent No. 3706036. These attempts end in evaluating the results in only some strength tests, and anything which provides a satisfying result in all the strength tests has not been provided. Needless to say, further improvement in the strength is also desired. In some cases, when it is attempted to obtain a high strength lens, thermal resistance is decreased (Japanese Patent No. 3541707, Japanese Laid-Open Patent Publication No. 2001-131257, and Japanese Patent No. 3562579). Providing both of strength and thermal resistance is indispensable but difficult. In some other cases, cured materials are cloudy, or lenses are not sufficiently cured to be practically used for glasses (Japanese Laid-Open Patent Publication No. 11-352302, Japanese Patent No. 3642973, and Japanese Laid-Open Patent Publication No. 2005-272788). In another case, a material which is difficult to be synthesized is used and such a material is thus difficult to be put into practice (Japanese Patent No. 3706036).

Accordingly, although a lens using an episulfide compound has a high refractive index and a high Abbe number, a lens having a higher strength and a higher thermal resistance has been desired to be developed.

DISCLOSURE OF THE INVENTION

A problem to be solved by the present invention is to provide a resin composition for optical material which is capable of providing an optical material having superb optical properties as well as a high strength and a high thermal resistance.

In light of such circumstance, the present inventors accumulated active studies and as a result, solved the problem and arrived at the present invention.

One embodiment of the present invention is directed to a resin compound for optical material, comprising (a) an episulfide compound represented by the following general formula (1), (b) a xylylenedithiol compound and (c) a xylylenediisocyanate compound:

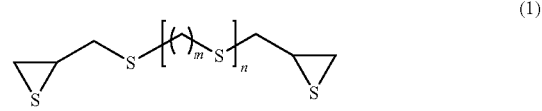

(1)

In the formula, m represents an integer of 0 through 4, and n represents an integer of 0 through 2.

A preferable embodiment of the present invention is directed to a resin compound for optical material, wherein the (a) episulfide compound is bis(β-epithiopropyl) sulfide or bis(β-epithiopropyl) disulfide. Another preferable embodiment of the present invention is directed to a resin compound for optical material, wherein the (b) xylylenedithiol compound is m-xylylenedithiol or p-xylylenedithiol. Another preferable embodiment of the present invention is directed to a resin compound for optical material, wherein the (c) xylylenediisocyanate compound is m-xylylenediisocyanate. Another preferable embodiment of the present invention is directed to a resin compound for optical material, wherein the (c) xylylenediisocyanate compound is 1,3-bis(1-isocyanate-1-methylethyl)benzene.

Another preferable embodiment of the present invention is directed to a resin compound for optical material, further comprising (d) a compound having both an ester group and a mercapto group. Another preferable embodiment of the present invention is directed to a resin compound for optical material, wherein the (d) compound having both an ester group and a mercapto group is at least one selected from the group consisting of trimethylolpropanetristhio glycolate, pentaerythritoltetrakisthio glycolate, trimethylolpropanetristhio propionate and pentaerythritoltetrakisthio propionate. Another preferable embodiment of the present invention is directed to a resin compound for optical material, further comprising (e) an inorganic compound having a sulfur atom.

Another preferable embodiment of the present invention is directed to a resin compound for optical material, wherein the ratio of the number of SH groups included in the resin compound for optical material with respect to the number of NCO groups included in the resin compound for optical material, i.e., "the number of SH groups/the number of NCO groups" is 1 to 2. Another preferable embodiment of the present invention is directed to a resin compound for optical material, wherein the (a) episulfide compound is included at 40% by weight to 90% by weight with respect to the resin compound for optical material. Another preferable embodiment of the present invention is directed to a resin compound for optical material, further comprising an onium salt and/or phosphine as (f) a polymerization catalyst at 0.001% by weight to 5% by weight with respect to the resin compound for optical material.

Another embodiment of the present invention is directed to an optical material obtained by curing the resin compound for optical material described above.

According to a preferable embodiment of the present invention, a resin compound for optical material and such an optical material, having superb properties such as a high strength, a thermal resistance and the like, can be provided.

BEST MODE FOR CARRYING OUT THE INVENTION

Hereinafter, the present invention will be described in more detail.

The present invention is directed to a resin compound for optical material comprising (a) an episulfide compound represented by the general formula (1) below, (b) a xylylenedithiol compound and (c) a xylylenediisocyanate compound.

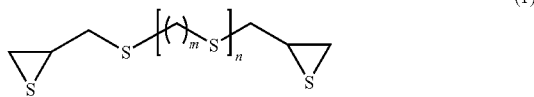

(1)

In the formula, m represents an integer of 0 through 4, and n represents an integer of 0 through 2.

In the present invention, an episulfide compound represented by the general formula (1) above is used in order to provide an optical material having a high refractive index and a good Abbe number in a good balance.

Preferable specific examples of the (a) episulfide compound represented by the general formula (1) include bis(β-epithiopropyl) sulfide, bis(β-epithiopropyl) disulfide, bis(β-epithiopropyl) trisulfide, bis(β-epithiopropylthio)methane, 1,2-bis(β-epithiopropylthio)ethane, 1,3-bis(β-epithiopropylthio)propane, 1,4-bis(β-epithiopropylthio)butane, bis(β-epithiopropylthioethyl) sulfide, and the like. The episulfide compounds represented by the general formula (1) may be used independently or as a mixture of two or more. Among the above-listed, preferable episulfide compounds are bis(β-epithiopropyl) sulfide and bis(β-epithiopropyl) disulfide represented by the following structural formulas, and the most preferable episulfide compound is bis(β-epithiopropyl) sulfide.

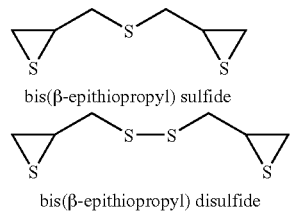

Preferable specific examples of the (b) xylylenedithiol compound include o-, m-, and p-xylylenedithiol. Among the above-listed, preferable xylylenedithiol compounds are m-xylylenedithiol and p-xylylenedithiol represented by the following structural formulas. An especially preferable xylylenedithiol compound is m-xylylenedithiol.

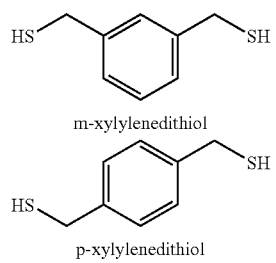

Preferable specific examples of the (c) xylylenediisocyanate compound include o-, m- and p-xylylenediisocyanate, 1,2-, 1,3- and 1,4-bis(1-isocyanate-1-methylethyl)benzene, and the like. These compounds may be used independently or as a mixture of two or more. Among the above-listed, preferable xylylenediisocyanate compounds are m-xylylenediisocyanate and 1,3-bis(1-isocyanate-1-methylethyl)benzene represented by the following structural formulas. An especially preferable xylylenediisocyanate compound is m-xylylenediisocyanate.

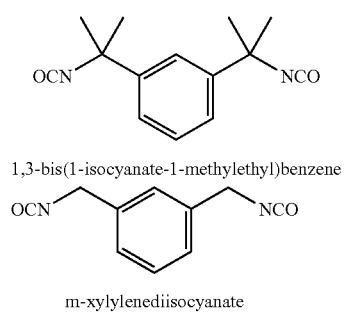

The (c) xylylenediisocyanate compound is desirably used independently, but xylylenediisocyanate and 1,3-bis(1-isocyanate-1-methylethyl)benzene may be mixed at an arbitrary ratio. In the case where such a mixture is used, a preferable mixing ratio is as follows when represented by the molarity ratio of NCO groups. Where the molarity of an NCO group in xylylenediisocyanate is z and the molarity of an NCO group in 1,3-bis(1-isocyanate-1-methylethyl)benzene is u, z/u is preferably 0.01 or greater and 10 or less. z/u is more preferably 0.05 or greater and 2 or less, and still more preferably 0.1 or greater and 1 or less.

A mixing ratio of a xylylenedithiol compound and a compound having both an ester group and a mercapto group is arbitrary (it should be noted that a xylylenedithiol compound needs to be used necessarily). In order to express more superb physical properties, it is preferable to use a xylylenedithiol compound as a main component and a compound having both an ester group and a mercapto group as a sub component. A preferable mixing ratio is as follows when represented by the molarity ratio of SH groups. Where the molarity of an SH group in a compound having both an ester group and a mercapto group is x and the molarity of an SH group in a xylylenedithiol compound is y, x/y is preferably 0.01 or greater and 2 or less. x/y is more preferably 0.1 or greater and 1.2 or less, still more preferably 0.2 or greater and 1.0 or less, and most preferably 0.3 or greater and 0.8 or less.

Preferable specific examples of (d) a compound having both an ester group and a mercapto group include ethyleneglycolbisthio glycolate, butanediolbisthio glycolate, hexanediolbisthio glycolate, trimethylolpropanetristhio glycolate, pentaerythritoltetrakisthio glycolate, ethyleneglycolbisthio propionate, butanediolbisthio propionate, trimethylolpropanetristhio propionate, pentaerythritoltetrakisthio propionate, and the like. Among the above-listed, preferable compounds are trimethylolpropanetristhio glycolate, pentaerythritoltetrakisthio glycolate, trimethylolpropanetristhio propionate, and pentaerythritoltetrakisthio propionate represented by the following structural formulas. The most preferable compound is pentaerythritoltetrakisthio propionate. These compounds may be used independently or as a mixture of two or more.

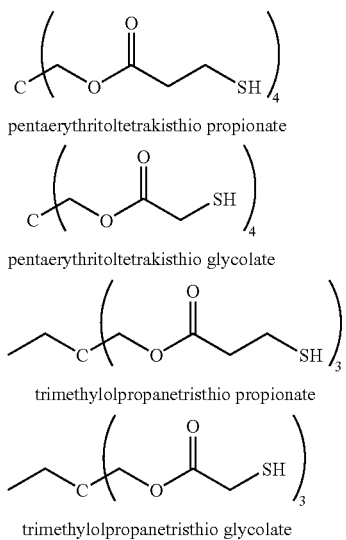

pentaerythritoltetrakisthio propionate pentaerythritoltetrakisthio glycolate trimethylolpropanetristhio propionate trimethylolpropanetristhio glycolate Preferable specific examples of (e) an inorganic compound having a sulfur atom include sulfur; hydrogen sulfide; carbon disulfide; selenium sulfide; carbon selenosulfide; ammonium sulfide; sulfur oxides such as sulfur dioxide, sulfur trioxide and the like; thiocarbonate; sulfuric acid and salt thereof, hydrogen sulfate; sulfite; hyposulfite, persulfate; thiocyanate; thiosulfate; sulfur dichloride; thionyl chloride; halides such as thiophosgene and the like; boron sulfide; nitrogen sulfide; silicon sulfide; phosphorus sulfide; arsenic sulfide; metal sulfide; metal hydrosulfide; and the like. Among the above-listed, preferable inorganic compounds are sulfur, carbon disulfide, and selenium sulfide. An especially preferable inorganic compound is sulfur. These compounds may be used independently or as a mixture of two or more. The amount of the (e) inorganic compound to be added with respect to the entire resin amount is 0.01 to 30% by weight, preferably 0.1 to 20% by weight, and more preferably 1 to 10% by weight.

In order to express a high strength, which is one object of the present invention, it is desirable that the ratio of the number of the SH groups included in the resin compound for optical material with respect to the number of the NCO groups included in the resin compound for optical material, i.e., "the number of SH groups/the number of NCO groups", is 1 or greater. Such a ratio is more preferably 1.1 or greater, and still more preferably 1.2 or greater. By contrast, in order to maintain a high thermal resistance, it is desirable that the ratio of the number of the SH groups included in the resin compound for optical material with respect to the number of the NCO groups included in the resin compound for optical material, i.e., "the number of SH groups/the number of NCO groups", is 2 or less. Such a ratio is more preferably 1.9 or less, and still more preferably 1.8 or less.

In order to provide an optical material having a high refractive index and a good Abbe number in a good balance, it is desirable that the ratio of the (a) episulfide compound having a high refractive index and a good Abbe number in a good balance with respect to the resin compound for optical material is 40% by weight or greater. Such a ratio is more preferably 50% by weight or greater, and still more preferably 60% by weight or greater. By contrast, in order to maintain a high strength, it is desirable that the ratio of the (a) episulfide compound with respect to the resin compound for optical material is 90% by weight or less. Such a ratio is more preferably 85% by weight or less, and still more preferably 80% by weight or less.

The ratio of the (b) xylylenedithiol compound with respect to the resin compound for optical material is preferably 1% by weight or greater and 50% by weight or less, more preferably 3% by weight or greater and 30% by weight or less, and still more preferably 5% by weight or greater and 20% by weight or less.

The ratio of the (c) xylylenediisocyanate compound with respect to the resin compound for optical material is preferably 1% by weight or greater and 50% by weight or less, more preferably 2% by weight or greater and 30% by weight or less, and still more preferably 3% by weight or greater and 20% by weight or less.

In the present invention, further as (f) a polymerization catalyst, an onium salt or a phosphine compound is preferably used. Preferable specific examples thereof include quaternary ammonium salt, quaternary phosphonium salt, tertiary sulphonium salt, secondary iodonium salt, phosphine compound, and the like. Among the above-listed, quaternary ammonium salt, quaternary phosphonium salt, and phosphine compound, which have a good compatibility with a resin compound for optical material, are more preferable; and quaternary ammonium salt is still more preferable. Specific examples of more preferable compounds include quaternary ammonium salts such as tetra-n-methylammonium chloride, tetra-n-ethylammonium chloride, tetra-n-butylammonium chloride, tetraoctylammonium chloride, tetraphenylammonium chloride, tetra-n-methylammonium bromide, tetra-n-ethylammonium bromide, tetra-n-butylammonium bromide, tetraoctylammonium bromide, tetraphenylammonium bromide, triethylbenzylammonium chloride, cetyldimethylbenzylammonium chloride, 1-n-dodecylpyridinium chloride, and the like; quaternary phosphonium salts such as tetra-n-methylphosphonium chloride, tetra-n-ethylphosphonium chloride, tetra-n-butylphosphonium chloride, tetraoctylphosphonium chloride, tetraphenylphosphonium chloride, tetra-n-methylphosphonium bromide, tetra-n-ethylphosphonium bromide, tetra-n-butylphosphonium bromide, tetraoctylphosphonium bromide, tetraphenylphosphonium bromide, and the like; phosphine compounds such as triphenylphosphine and the like. Among the above-listed, more preferable compounds are triethylbenzylammonium chloride, tetra-n-butylphosphonium bromide, and triphenylphosphine. The most preferable compound is tetra-n-butylphosphonium bromide.

The amount of the (f) polymerization catalyst to be added varies in accordance with the components of the resin compound for optical material, the mixing ratio and the polymerization curing method and thus cannot be absolutely determined, but is usually preferably, with respect to the resin compound for optical material, 0.001% by weight or greater and 5% by weight or less, more preferably 0.01% by weight or greater and 1% by weight or less, and most preferably 0.01% by weight or greater and 0.5% by weight or less. When the added amount of the (f) polymerization catalyst is greater than 5% by weight, the refractive index and the thermal resistance of the cured material may be decreased, which causes the cured material to be colored. By contrast, when the added amount of the (f) polymerization catalyst is less than 0.001% by weight, the resin compound may not be sufficiently cured, which results in an insufficient thermal resistance.

For treating the resin compound for optical material with polymerization curing, a polymerization adjuster can optically be added for the purpose of extending the pot life or dispersing the polymerization heat. Examples of the polymerization adjuster include groups XIII through XVI halides in the long form of periodic table. Among these, preferable compounds are halides of silicon, germanium, tin, and antimony. More preferable compounds are chlorides of germanium, tin and antimony having an alkyl group. Still more preferable compounds are specifically dibutyltin dichloride, butyltin trichloride, dioctyltin dichloride, octyltin trichloride, dibutyldichloro germanium, butyltrichloro germanium, diphenyldichloro germanium, phenyltrichloro germanium, and triphenylantimony dichloride. A specific example of the most preferable compound is dibutyltin dichloride. The polymerization adjusters may be used independently or as a mixture of two or more.

Other polymerization adjusters include phosphate and phenylboric acid. Among these, preferable compounds are dimethyl phosphate, diethyl phosphate, dibutyl phosphate, dibutoxyethyl phosphate, di(2-ethylhexyl) phosphate, diisodecyl phosphate, dilauryl phosphate, distearyl phosphate, di-n-hexadecyl phosphate, dioleyl phosphate, ditetracosyl phosphate, diphenyl phosphate, diethyleneglycol phosphate, and phenylboric acid. More preferable compounds are diphenyl phosphate and phenylboric acid. The most preferable compound is diphenyl phosphate. These compounds may be used independently or as a mixture of two or more.

The amount of the polymerization adjuster to be added is usually, with respect to the resin compound for optical material, 0.0001 to 5.0% by weight, preferably 0.0005 to 3.0% by weight, and more preferably 0.001 to 2.0% by weight.

In order to adjust various physical properties of the cured material, such as the refractive index and the like, it is possible to use, in the resin compound for optical material according to the present invention, an episulfide compound other than the (a) compound, a thiol compound other than the (b) compound, an isocyanate compound other the (c) compound, an epoxy compound, or an alcohol having an unsaturated group.

For providing an optical material by polymerization curing of the resin compound for optical material according to the present invention, the practicality of the material to be obtained can be improved by adding a well known additive such as an antioxidant, ultraviolet absorber, bluing agent or the like, needless to say.

Preferable examples of the antioxidant include phenol derivatives. Among these, preferable compounds are polyhydric phenols and halogen substituted phenols. More preferable compounds are catecol, pyrogallol, alkyl substituted catecols. The most preferable compounds are catecol and pyrogallol. Preferable examples of the ultraviolet absorber include benzotriazol-based compounds and benzophenone-based compounds. Among these, preferable compounds are benzotriazol-based compounds. Specific examples of especially preferable compounds are 2-(2-hydroxy-5-methylphenyl)-2H-benzotriazol, 5-chloro-2-(3,5-di-tert-butyl-2-hydroxyphenyl)-2H-benzotriazol, 2-(3-tert-butyl-2-hydroxy-5-methylphenyl)-5-chloro-2H-benzotriazol, 2-(3,5-di-tert-pentyl-2-hydroxyphenyl)-2H-benzotriazol, 2-(3,5-di-tert-butyl-2-hydroxyphenyl)-2H-benzotriazol, 2-(2-hydroxy-4-octyloxyphenyl)-2H-benzotriazol, and 2-(2-hydroxy-5-tert-octylphenyl)-2H-benzotriazol. Preferable examples of the bluing agent include anthraquinone-based compounds. The amount of each of these antioxidants, ultraviolet absorbers and bluing agents to be added is usually 0.000001 to 5% by weight with respect to the resin compound for optical material.

In the case where the resin compound for optical material according to the present invention tends to come off from the mold during the polymerization, a well known external and/or internal adhesion improving agent can be used or added to improve the adhesion between the cured material to be obtained and the mold. Examples of the adhesion improving agent include a well known silane coupling agent, well known titanate compounds, and the like. These materials may be used independently or as a mixture of two or more. The amount to be added is usually 0.0001 to 5% by weight with respect to the resin compound for optical material. By contrast, in the case where the resin compound for optical material according to the present invention tends not to come off from the mold after the polymerization, a well known external and/or internal releasing agent can be used or added to improve the releasability of the cured material to be obtained from the mold. Examples of the releasing agent include fluoride-based nonion surfactant, silicon-based nonion surfactant, phosphoric acid ester, acidic phosphoric acid ester, oxyalkylene-type acidic phosphoric acid ester, alkaline metal salt of acidic phosphoric acid ester, alkaline metal salt of oxyalkylene-type acidic phosphoric acid ester, metal salt of higher fatty acid, higher fatty acid ester, paraffin, wax, higher fatty acid amide, higher fatty acid alcohol, polysiloxanes, aliphatic amine ethylene oxide adduct, and the like. These materials may be used independently or as a mixture of two or more. The amount to be added is usually 0.0001 to 5% by weight with respect to the resin compound for optical material.

A method for producing an optical material by polymerization curing of a resin compound for optical material according to the present invention is as follows in more detail. The above-described components of the compound and additives such as antioxidant, ultraviolet absorber, polymerization catalyst, radical polymerization initiator, adhesion improving agent, releasing agent and the like may be all mixed by stirring together in the same container; each material may be added and mixed step by step; or groups, each of several components, may be first mixed separately and then all the groups may be mixed together in the same container. The materials and sub-materials may be mixed in any order. The set temperature, required time and the like for mixing are basically not limited as long as the components are sufficiently mixed.

According to the present invention, it is preferable to perform degassing treatment of the resin compound for optical material in advance. This may occasionally achieve a high degree of transparency of the optical material. The degassing treatment is preferably performed before, during or after the mixture of compounds reactable with a part or all the components of the composition, the polymerization catalyst and the additives, under reduced pressure. Preferably, the degassing treatment is performed during or after the mixture under reduced pressure. The treatment conditions are the pressure reduction degree of 0.001 to 50 torr, 1 minute to 24 hours, and 0° C. to 100° C. The pressure reduction degree is preferably 0.005 to 25 torr, and more preferably 0.01 to 10 torr. The pressure reduction degree may be changed within such a range. The degassing time is preferably 5 minutes to 18 hours, and more preferably 10 minutes to 12 hours. The temperature during the degassing is preferably 5° C. to 80° C., and more preferably 10° C. to 60° C. The temperature may be changed within such a range. During the degassing treatment, updating the surface of the resin compound by stirring, gas blowing, vibration with ultrasonic waves is a preferable operation for improving the degassing effect. The components removed by the degassing treatment are mainly, for example, dissolved gas such as hydrogen sulfide or the like or a low boiling point substance such as thiol having a low molecular weight and the like. Filtering out a solid or the like from the resin composition and/or each pre-mixing material using a filter having a porous diameter of about 0.05 to 10 μm for refinement is also preferable for improving the quality of the optical material according to the present invention.

The resin compound for optical material obtained in this manner is injected into a glass or metal mold. After polymerization curing proceeds by heating or radiation of active energy rays such as ultraviolet rays or the like, the resin compound is removed from the mold. Preferably, the resin compound is polymerized and cured by heating. In this case, the curing time is 0.1 to 200 hours, and usually 1 to 100 hours. The curing temperature is −10 to 160° C., and usually −10 to 140° C. For the polymerization, the temperature is held at a prescribed polymerization temperature for a prescribed time period, increased at 0.1° C. to 100° C./hour and decreased at 0.1° C. to 100° C./hour. These processes can be combined. After the polymerization is finished, annealing the cured material at a temperature of 50 to 150° C. for about 10 minutes to 5 hours is a preferable treatment for removing the distortion of the optical material according to the present invention. Optionally, surface treatment such as dyeing, hard-coating, anti-impact-coating, reflection prevention, antifogging or the like can be performed.

The polymer obtained in this manner is three-dimensionally crosslinked and thus is a resin-like material which is made insoluble and unmeltable.

EXAMPLES

Hereinafter, the present invention will be specifically described by way of examples. The present invention is not limited to these examples. The evaluation was made by the following method.

Strength against dropping: A 10 g iron ball was dropped onto a flat plate having a thickness of 2.5 mm from the height of 127 cm. The weight of the iron ball was increased 10 g by 10 g, and the test was conducted until the flat plate was destroyed. The impact energy given by the iron ball when the plate was destroyed was measured.

Strength against drilling: A hole having a diameter of 2 mm was made in a flat plate having a thickness of 2.5 mm at a drill rotation rate of 2500 rpm and a drill admission speed of 600 mm/min. The state of the surrounding area at this time was measured. "O" indicates that the surrounding area is not chipped, and "X" indicates that the surrounding area is chipped.

Tensile strength: A hole having a diameter of 2 mm was made in a plano lens having a diameter of 50 mm and a thickness of 2 mm at positions of 4 mm from both of ends thereof. A pin was inserted to each of the two holes to fix both ends, and the ends were pulled at a speed of 10 mm/min. The strength (kgf) at the time of destruction was measured.

Thermal resistance: A pin having a diameter of 1 mm was put on a sample having a thickness of 3 mm, and a load of 10 g was applied thereon. The temperature thereof was raised from 30° C. at a rate of 10° C./min. TMA measurement was performed, and the value of a peak at which the thermal expansion was changed was measured. "O" indicates 80° C. or higher, and "X" indicates lower than 80° C.

The refractive index, Abbe number: Measured at 25° C. using an Abbe refractometer (Abbe Refractometer NAR-4T, produced by Atago Co., Ltd.).

In the measurement of the refractive index, the refractive index was measured at d line (587.6 nm, yellow). This is generally represented as $n_d$.

In the measurement of the Abbe number, the refractive index was first measured at d line (587.6 nm, yellow), F line (486.1 nm, blue) and C line (656.3 nm, red). Where the respective values are $n_d$, $n_F$ and $n_C$, the Abbe number $v_d$ is found by the following expression.

$$v_d = (n_d - 1)/(n_F - n_C)$$

Example 1

67 parts by weight of bis(β-epithiopropyl) sulfide as the (a) episulfide compound, 16 parts by weight of m-xylylenedithiol as the (b) xylylenedithiol compound, 17 parts by weight of 1,3-bis(1-isocyanate-1-methylethyl)benzene as the (c) xylylenediisocyanate compound, 0.005 parts by weight of sodium polyoxyethylene lauryl ether phosphate as the internal releasing agent, 0.05 parts by weight of dibutyltin dichloride as the polymerization adjuster, 0.1 parts by weight of tetrabutylphosphonium bromide as the polymerization catalyst, 0.005 parts by weight of catecol as the antioxidant, and 0.5 parts by weight of 2-(2-hydroxy-5-tert-octylphenyl)benzotriazol as the ultraviolet absorber were mixed and stirred at room temperature to obtain a uniform liquid. Then, the above-obtained composition was degassed under a reduced pressure of 10 torr for 30 minutes, and then injected into a mold for lenses. The temperature thereof was raised from 30° C. to 100° C. over 22 hours in an oven to polymerize and cure the composition. Then, the composition was removed from the mold, and heated at 110° C. for 1 hour to perform annealing. The obtained lens was transparent and had a good external appearance. The optical properties, strength and thermal resistance were measured. The results are shown in Table 1.

Examples 2 through 6

The operation described in Example 1 was performed with the compositions shown in Table 1. The obtained lenses were all transparent and had a good external appearance. The optical properties, strength and thermal resistance were measured. The results are shown in Table 1.

Examples 7 through 14

The operation described in Example 1 was performed with compositions also using (d) a compound having both an ester group and a mercapto group as shown in Table 1. The obtained lenses were all transparent and had a good external appearance. The optical properties, strength and thermal resistance were measured. The results are shown in Table 1.

Examples 15 and 16

The operation described in Example 1 was performed with compositions also using (e) an inorganic compound having a sulfur atom as shown in Table 1. The obtained lenses were all transparent and had a good external appearance. The optical properties, strength and thermal resistance were measured. The results are shown in Table 1.

Examples 17 through 20

The operation described in Example 1 was performed with compositions also using (d) a compound having both an ester group and a mercapto group and (e) an inorganic compound having a sulfur atom as shown in Table 1. The obtained lenses were all transparent and had a good external appearance. The optical properties, strength and thermal resistance were measured. The results are shown in Table 1.

Comparative Examples 1 Through 8

The operation described in Example 1 was performed with the compositions shown in Table 2. Polymerization curing was performed on compositions which exclude the (b) xylylenedithiol compound or the (c) xylylenediisocyanate compound and use another compound. Therefore, the strength was insufficient. In some examples, the thermal resistance was also insufficient.

TABLE 1

| Ex. | Composition (% by weight) | | | | | | | | | | | Optical property | | Strength | | | Thermal resistance |
|---|---|---|---|---|---|---|---|---|---|---|---|---|---|---|---|---|---|
| | (a) | | (b) | | (c) | | (d) | | (e) | | | Refractive index | Abbe number | Dropping | Drilling | Tensile | |
| 1 | a-1 | 67 | b-1 | 16 | c-1 | 17 | | | | | | 1.68 | 34 | 4.9 | ○ | 58 | ○ |
| 2 | a-1 | 89 | b-1 | 7 | c-1 | 4 | | | | | | 1.70 | 35 | 4.5 | ○ | 50 | ○ |
| 3 | a-1 | 78 | b-1 | 11 | c-1 c-2 | 5 6 | | | | | | 1.70 | 34 | 4.8 | ○ | 61 | ○ |
| 4 | a-1 | 75 | b-1 | 14 | c-1 c-2 | 5 6 | | | | | | 1.70 | 34 | 4.8 | ○ | 67 | ○ |
| 5 | a-1 | 82 | b-1 | 11 | c-1 c-2 | 5 2 | | | | | | 1.70 | 34 | 4.6 | ○ | 67 | ○ |
| 6 | a-2 | 67 | b-1 | 16 | c-1 | 17 | | | | | | 1.70 | 34 | 4.5 | ○ | 52 | ○ |
| 7 | a-1 | 80 | b-1 | 6 | c-2 | 8 | d-1 | 6 | | | | 1.70 | 34 | 4.7 | ○ | 74 | ○ |
| 8 | a-1 | 78 | b-1 | 11 | c-2 | 9 | d-2 | 2 | | | | 1.70 | 34 | 4.7 | ○ | 67 | ○ |
| 9 | a-1 | 80 | b-1 | 5 | c-1 | 10 | d-2 | 5 | | | | 1.69 | 34 | 4.6 | ○ | 60 | ○ |
| 10 | a-1 | 77 | b-2 | 8 | c-2 | 10 | d-1 | 5 | | | | 1.70 | 34 | 4.7 | ○ | 94 | ○ |
| 11 | a-1 | 74 | b-2 | 10 | c-2 | 10 | d-1 | 6 | | | | 1.70 | 34 | 4.7 | ○ | 80 | ○ |
| 12 | a-1 | 77 | b-2 | 10 | c-2 | 9 | d-3 | 4 | | | | 1.70 | 34 | 4.5 | ○ | 52 | ○ |
| 13 | a-1 | 78 | b-1 | 6 | c-1 | 10 | d-4 | 6 | | | | 1.69 | 34 | 4.5 | ○ | 51 | ○ |
| 14 | a-2 | 77 | b-2 | 8 | c-2 | 10 | d-1 | 5 | | | | 1.72 | 32 | 4.7 | ○ | 64 | ○ |
| 15 | a-1 | 76 | b-1 | 12 | c-2 | 11 | | | e-1 | 1 | | 1.70 | 34 | 4.7 | ○ | 67 | ○ |
| 16 | a-1 | 74 | b-2 | 12 | c-2 | 11 | | | e-1 | 3 | | 1.71 | 33 | 4.6 | ○ | 90 | ○ |
| 17 | a-1 | 77 | b-1 | 6 | c-2 | 8 | d-1 | 6 | e-1 | 3 | | 1.71 | 33 | 4.6 | ○ | 71 | ○ |
| 18 | a-1 | 50 | b-2 | 10 | c-2 | 22 | d-1 | 13 | e-1 | 5 | | 1.67 | 35 | 5.1 | ○ | 66 | ○ |
| 19 | a-1 | 40 | b-2 | 11 | c-2 | 27 | d-1 | 16 | e-1 | 6 | | 1.66 | 35 | 5.1 | ○ | 65 | ○ |
| 20 | a-1 | 77 | b-1 | 5 | c-1 | 10 | d-2 | 5 | e-1 | 3 | | 1.70 | 33 | 4.5 | ○ | 58 | ○ |

Short representations of the compounds
(a) Episulfide compound
a-1: bis(β-epithiopropyl) sulfide
a-2: bis(β-epithiopropyl) disulfide
(b) Xylylenedithiol compound
b-1: m-xylylenedithiol
b-2: p-xylylenedithiol
(c) Xylylenediisocyanate compound
c-1: 1,3-bis(1-isocyanate-1-methylethyl)benzene
c-2: m-xylylenediisocyanate
(d) Compound having both an ester group and a mercapto group
d-1: pentaerythritoltetrakisthio propionate
d-2: pentaerythritoltetrakisthio glycolate
d-3: trimethylolpropanetristhio propionate
d-4: trimethylolpropanetristhio glycolate
(e) Inorganic compound having a sulfur atom
e-1: sulfur

TABLE 2

| Comparative example | Composition (% by weight) | Optical property Refractive index | Abbe number | Strength Dropping | Drilling | Tensile | Thermal resistance |
|---|---|---|---|---|---|---|---|
| 1 | a-1/b-1/BIC = 67/16/17 | 1.66 | 35 | 3.3 | X | 35 | X |
| 2 | a-1/b-1/DIMB = 67/16/17 | 1.66 | 35 | 2.8 | X | 33 | X |
| 3 | a-1/b-1/BIND = 67/16/17 | 1.70 | 34 | 3.3 | X | 42 | X |
| 4 | a-1/b-2/BIC = 67/16/17 | 1.66 | 35 | 3.2 | X | 35 | X |
| 5 | a-1/DMDS/c-1 = 67/16/17 | 1.69 | 34 | 3.8 | X | 38 | ○ |
| 6 | a-1/DMMD/c-1 = 67/16/17 | 1.69 | 34 | 3.8 | X | 38 | ○ |
| 7 | a-2/DMMD/c-2 = 67/16/17 | 1.72 | 32 | 1.9 | X | 29 | X |
| 8 | a-1/DMMD/c-2/e-1 = 74/12/11/3 | 1.71 | 34 | 3.5 | ○ | 45 | ○ |

Short representations of the compounds
a-1: bis(β-epithiopropyl) sulfide
a-2: bis(β-epithiopropyl) disulfide
b-1: m-xylylenedithiol
b-2: p-xylylenedithiol
DMDS: bis(2-mercaptoethyl) sulfide
DMMD: 2,5-bis(mercaptomethyl)-1,4-dithiane
c-1: m-tetramethylxylenediisocyanate
c-2: m-xylylenediisocyanate
BIC: 1,3-bis(isocyanatemethyl)cyclohexane
DIMB: di(isocyanatemethyl)bicycloheptane
BIND: 2,5-bis(isocyanatemethyl)-1,4-dithiane
e-1: sulfur By treating a resin compound for optical material, which is a preferable embodiment of the present invention, with polymerization curing, it is made possible to provide an optical material having a sufficiently high refractive index and a good Abbe number and also having a high strength and a high thermal resistance, which is difficult as long as the conventional compounds are used as materials.

The invention claimed is:

1. A resin compound for optical material, comprising
   (a) an episulfide compound represented by the following general formula (1),
   (b) a xylylenedithiol compound,
   (c) a xylylenediisocyanate compound:

(1)

(in the formula, m represents an integer of 0 through 4, and n represents an integer of 0 through 2); and
   (d) a compound having both an ester group and a mercapto group,
   wherein a molar ratio of an SH group in the (d) compound having both an ester group and a mercapto group to an SH group in the (b) xylylenedithiol compound is greater than 0.1 and less than 1.2; and the (d) compound is at least one compound selected from the group consisting of (i) trimethylolpropanetristhio glycolate, (ii) pentaerythritoltetrakisthio glycolate, (iii) trimethylolpropanetristhio propionate and (iv) pentaerythritoltetrakishio propionate and wherein the resin compound for optical material has a refractive index of from 1.66 to 1.72.

2. The resin compound for optical material according to claim 1, wherein the (a) episulfide compound is bis(β-epithiopropyl) sulfide or bis(β-epithiopropyl) disulfide.

3. The resin compound for optical material according to claim 1, wherein the (b) xylylenedithiol compound is m-xylylenedithiol or p-xylylenedithiol.

4. The resin compound for optical material according to claim 1, wherein the (c) xylylenediisocyanate compound is m-xylylenediisocyanate.

5. The resin compound for optical material according to claim 1, wherein the (c) xylylenediisocyanate compound is 1,3-bis(1-isocyanate-1-methylethyl)benzene.

6. The resin compound for optical material according to claim 1, further comprising (e) an inorganic compound having a sulfur atom.

7. The resin compound for optical material according to claim 1, wherein the ratio of the number of SH groups included in the resin compound for optical material with respect to the number of NCO groups included in the resin compound for optical material is 1 to 2.

8. The resin compound for optical material according to claim 1, wherein the (a) episulfide compound is included at 40% by weight to 90% by weight with respect to the resin compound for optical material.

9. The resin compound for optical material according to claim 1, further comprising an onium salt and/or phosphine as (f) a polymerization catalyst at 0.001% by weight to 5% by weight with respect to the resin compound for optical material.

10. An optical material obtained by curing the resin compound in any one of the proceeding claims.

* * * * *